May 21, 1935.  C. BORNMANN ET AL  2,002,076
PHOTOGRAPHIC CAMERA
Filed Jan. 18, 1934
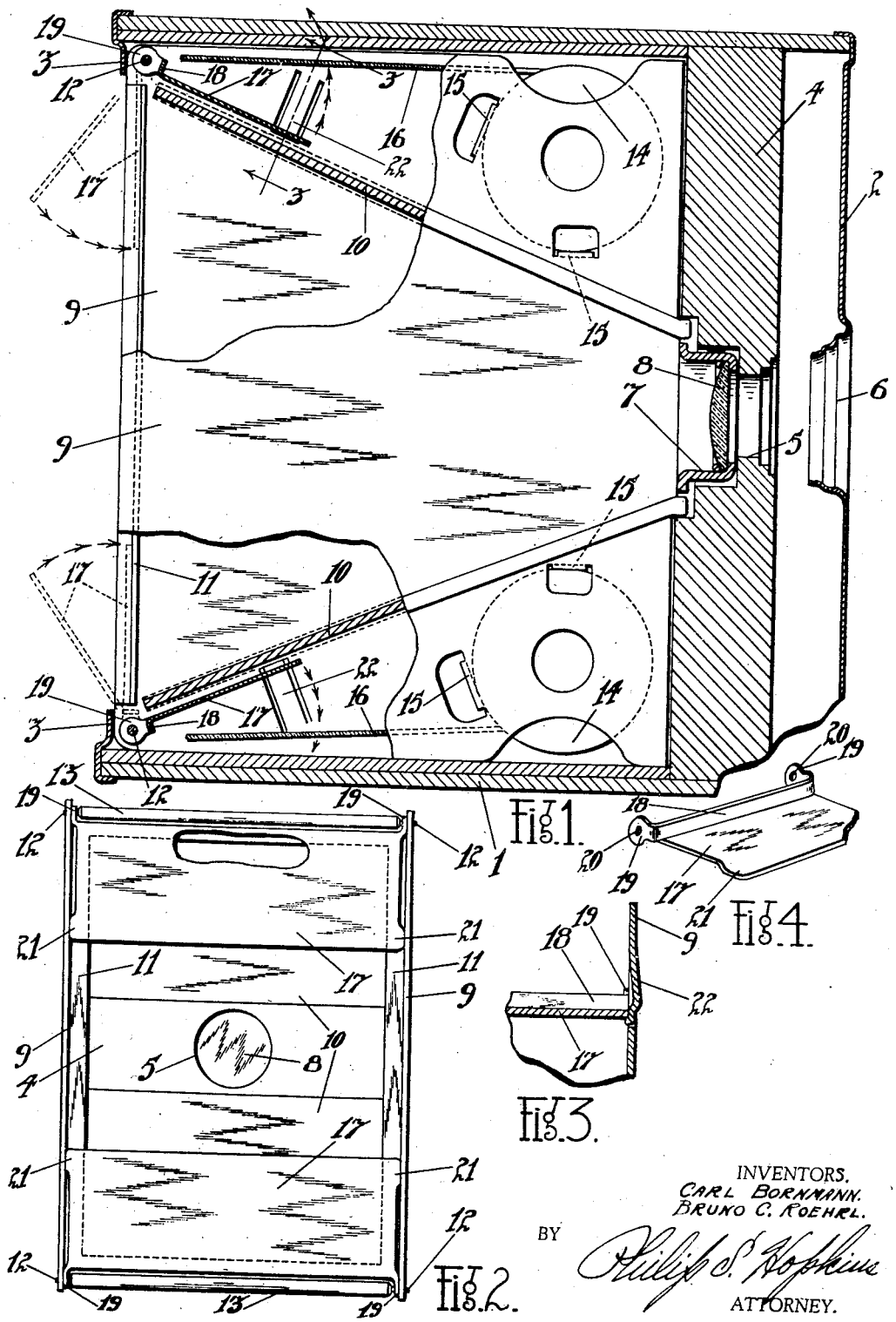
INVENTORS.
CARL BORNMANN.
BRUNO C. ROEHRL.
BY
ATTORNEY.

Patented May 21, 1935

2,002,076

UNITED STATES PATENT OFFICE 2,002,076

PHOTOGRAPHIC CAMERA

Carl Bornmann and Bruno C. Roehrl, Binghamton, N. Y., assignors to Agfa Ansco Corporation, Binghamton, N. Y., a corporation of New York Application January 18, 1934, Serial No. 707,145

2 Claims. (Cl. 95—31)

Our invention relates to a photographic camera and has for its object the provision of means for selectively making possible, exposures of different sizes on the sensitized film in the camera.

Another object of our invention lies in the provision of exposure size determining flaps which may be readily swung into position for covering a portion of the film lying in the focal plane of the camera and to a position away from such film and within the film storage compartments of the camera entirely outside of the exposure area.

Still another object lies in the provision of means for frictionally retaining the flaps in either position of adjustment.

Other objects and advantages will be apparent as the description proceeds, reference now being had to the figures of the accompanying drawing forming a part of this application and wherein like reference numerals indicate like parts.

In the drawing:

Figure 1 is a cross sectional view of a box camera embodying my invention certain parts being broken away for clearness of illustration.

Figure 2 is a rear view of the camera with the exposure determining flaps in film covering position.

Figure 3 is a detail sectional view taken on the line 3—3 illustrating one of the frictional retaining means for the flaps.

Figure 4 is a detail perspective view of one of the flaps.

The reference character 1 indicates the outside box or casing of the camera provided at the front with a front cover plate 2 and at the rear with a back cover plate 3. Disposed within the camera box 1 is a front board 4 provided with a central opening 5 in alignment with an opening 6 in the front cover plate 2. Suitably mounted in the front board 4 is a lens mount 7 carrying a lens 8 in alignment with the openings 5 and 6.

Removably mounted within the box 1, is a film carrying frame comprising the parallel side plates 9 secured together in spaced relation by means of the angularly disposed top and bottom plates 10, such plates diverging from above and below the lens mount 7 in the front board 4, to points adjacent the upper and lower portions of the side plates 9 as shown clearly in Figure 1. The side plates 9 are provided at their rear edges with inwardly turned flanges 11.

The open space at the rear of the camera thus defined by the flanges 11 and by the ends of the plates 10 comprise the normal exposure space of the camera. Journaled in the side plates 9 and extending between the same at points adjacent the upper and lower rear edges thereof, are pintles 12 upon which are rotatably mounted anti-friction rollers 13.

Adjacent the forward portion of the inner frame, the spaces between the side plates 9 above and below the plates 10 are provided to receive film spools 14. The side plates 9 are provided with inwardly turned fingers 15 struck from the plates to provide supporting bearings for the spools 14 and against which the flanges of such spools may rotate.

The upper spool 14 comprises the supply spool from which the film 16 extends rearwardly over the friction roller 13 and downwardly over the exposure space under the bottom anti-friction roller 13 and forwardly to the takeup spool 14 in the lower chamber.

Pivoted to each of the pintles 12 at points between the ends of anti-friction rollers 13 and the adjacent side plates 9 is a flap 17. This flap 17 is provided adjacent one edge with an angularly turned flange 18, the ends of which are provided with angularly extending ears 19 provided with the aligned openings 20 by means of which the flap is pivoted upon the pintle 12. The ends of the flaps 17 adjacent their free edges are provided with slightly enlarged extensions 21, which in the normal position of the flaps shown in full lines in Figure 1, are adapted to engage the resilient tongues 22 struck from the side plates 9 whereby to frictionally retain the flaps 17 in such position. It will be observed that in this position, the flaps lie directly adjacent the plates 10 and outside of the exposure chamber of the camera.

With the flaps 17 in this position it is obvious that a full size exposure will be made upon the film 16 in the exposure space between the anti-friction rollers 13 and between the flanges 11.

If it is desired, however, to make a half size exposure only upon the film, the flaps 17 may be rotated about the pintles 12 to the dotted line position shown in Figure 1 and in full lines in Figure 2, in which position the flaps engage against the flanges 11 and the enlarged ends thereof engage frictionally against the inner surfaces of the side plates 9 whereby the flaps are retained in such adjusted position. This adjustment of the flaps must, of course, be made with the film carrying frame of the camera outside of the camera box or casing 1 and prior to the threading of the film 16 from one spool to the other around the anti-friction rollers. When the adjustment has been made, however, and the film threaded around the rollers and past the exposure station as before described, the film carrying frame may be inserted within the casing and the exposure area for the film is then defined by the side flanges 11 and the free edges of the flaps 17, such flaps lying between the lens 8 and the film.

It will be clear that by this construction we have provided a means whereby the user of the camera can selectively make a given number of full size exposures on a single strip of film or twice that number of half size exposures on the same film. When the full sized exposures are desired the size determining flaps are entirely outside of the exposure chamber where they do not interfere with the passage of the light from the lens to the film and in which position they are frictionally retained against possible interference with the movement of the film.

Of course, changes may be made in details of construction and arrangement of parts without departing from the spirit and scope of my invention. We do not limit ourselves, therefore, other than by the appended claims.

We claim:

1. A photographic camera comprising an outer casing and an inner casing, means between said casings for journaling film spools, one side of said inner casing being open and comprising the exposure area past which a film may be moved from one spool to the other, and flaps pivoted adjacent said open side and selectively adjustable to a position partially closing said opening and to a position between said casings and wholly outside said exposure area.

2. A photographic camera comprising an outer casing and an inner casing, means between said casings for journaling film spools, one side of said inner casing being open and comprising the exposure area past which a film may be moved from one spool to the other, flaps pivoted adjacent said open side and selectively adjustable to a position partially closing said opening and to a position between said casings and wholly outside said exposure area, and means for frictionally holding said flaps in both positions of adjustment.

CARL BORNMANN.
BRUNO C. ROEHRL.